(12) United States Patent
Nam

(10) Patent No.: US 7,031,128 B2
(45) Date of Patent: Apr. 18, 2006

(54) POWER CIRCUIT PROTECTION APPARATUS

(75) Inventor: Youn-ik Nam, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/867,756

(22) Filed: Jun. 16, 2004

(65) Prior Publication Data

US 2005/0002133 A1   Jan. 6, 2005

(30) Foreign Application Priority Data

Jul. 4, 2003   (KR) ...................... 10-2003-0045407

(51) Int. Cl.
*H02H 3/24* (2006.01)

(52) U.S. Cl. .......................................... 361/90; 361/18

(58) Field of Classification Search .................. 361/90, 361/18; 307/407, 410, 411
See application file for complete search history.

(56) References Cited

U.S. PATENT DOCUMENTS

| | | | | |
|---|---|---|---|---|
| 3,660,750 A | * | 5/1972 | Businelli ..................... 363/23 |
| 4,005,352 A | * | 1/1977 | Kugler et al. ................. 363/26 |
| 4,020,408 A | * | 4/1977 | Grant ...................... 363/21.08 |
| 4,520,275 A | * | 5/1985 | Marusik ....................... 307/64 |
| 4,789,818 A | * | 12/1988 | Furuta ......................... 323/285 |
| 5,122,726 A | * | 6/1992 | Elliott et al. ................. 323/272 |
| 5,319,536 A | * | 6/1994 | Malik ........................... 363/65 |
| 5,430,405 A | * | 7/1995 | Cohen ........................ 327/581 |
| 6,133,650 A | | 10/2000 | Miyamoto et al. |
| 6,169,675 B1 | * | 1/2001 | Shimamori et al. ........... 363/70 |
| 2002/0125871 A1 | | 9/2002 | Groom et al. |

FOREIGN PATENT DOCUMENTS

EP   1 058 374 A   12/2000

* cited by examiner

*Primary Examiner*—Brian Sircus
*Assistant Examiner*—Zeev Kitov
(74) *Attorney, Agent, or Firm*—Sughrue Mion, PLLC

(57) ABSTRACT

A power circuit protection apparatus halting an operation of a pulse width modulation (PWM) controller when an abnormal state is generated due to an open or short in a secondary side winding of a transformer is provided. The apparatus includes: a transformer; an output unit which receives voltages output from the transformer, rectifies and smoothes the received voltage, and outputs the rectified and smoothed voltage; a PWM controller which receives the voltage output from the output unit and outputs a PWM signal with an adjusted duty cycle; a voltage sensing unit which senses voltages induced in the secondary side coils of the transformer; a blocking unit which blocks interference between sensed voltages and a first reference voltage; and a comparison unit which compares a variation value of the first reference voltage with respect to a second reference voltage and outputs a signal determining an on/off operation of the PWM controller.

5 Claims, 3 Drawing Sheets

POWER CIRCUIT PROTECTION APPARATUS

BACKGROUND OF THE INVENTION

This application claims the priority of Korean Patent Application No. 2003-45407, filed on Jul. 4, 2003, in the Korean Intellectual Property Office, the disclosure of which is incorporated herein in its entirety by reference.

1. Field of the Invention

The present invention relates to a switching mode power supply (SMPS) powering electronic devices, and more particularly, to a power circuit protection apparatus halting an operation of a pulse width modulation (PWM) controller in a case where an abnormal state is generated due to an open or short in a secondary side winding of a transformer.

2. Description of the Related Art

In general, an SMPS using a pulse width modulation (PWM) method has controlled a power source of an electronic device by realizing line regulation in a primary side winding of the power source and load regulation in a secondary side winding of the power source using a PWM controller.

In general, an SMPS obtains direct current (DC) power by directly rectifying and filtering a common use alternating current (AC) power and converting the DC voltage into a high frequency square wave.

Also, after the SMPS conducts the voltage having a square waveform to an insulating transformer having a certain winding ratio, the SMPS converts the voltage into a DC voltage by rectifying and filtering the voltage waveform of a secondary side winding of the insulating transformer. Here, the SMPS is made so as to control an on/off time of a semiconductor device for switching in order to supply a constant DC voltage to a load.

The SMPS performs line regulation by sensing a current from an output signal of a switching unit controlled by a PWM controller and load regulation by detecting a voltage variation induced by coils of loads on a secondary side of the power supply and compensates a voltage of the secondary side of the power supply by feeding back the result of the line regulation and the load regulation to the PWM controller.

FIG. 1 is a block diagram of a conventional switching mode power supply (SMPS).

With reference to FIG. 1, the SMPS includes an AC input unit 100, a rectifier 101, a transformer 102, a switching unit 103, a PWM controller 104, a current sensing unit 105, an output unit 106, and an initial driving unit 107.

The AC input unit 100 inputs an AC voltage from the outside and conducts the AC voltage to the rectifier 101.

The rectifier 101 rectifies the AC voltage conducted from the AC input unit 100 into a DC voltage and outputs the DC voltage to a primary side coil of the transformer 102.

The transformer 102 inputs the DC voltage from the rectifier 101, is controlled by a switching control signal conducted from the switching unit 103, and induces a predetermined voltage in a secondary side coil of the transformer 102.

The output unit 106 rectifies and smoothes the voltage induced in the secondary side coil of the transformer 102 and outputs a predetermined voltage $V_{out}$. The output unit 106 includes a rectifying diode D1 and a smoothing condenser C2 for rectifying and smoothing the voltage induced in the secondary side coil of the transformer 102.

The switching unit 103 includes a switching component such as a field effect transistor (FET), and the on/off time of the switching unit 103 is controlled by a PWM signal output from the PWM controller 104. Therefore, the switching unit 103 controls outputs of the transformer 102 by the PWM signal output from the PWM controller 104.

The current sensing unit 105 senses an output current of the switching unit 103 and conducts the sensed current to the PWM controller 104.

The PWM controller 104 receives the generated voltage error by sensing the voltage $V_{out}$ output from the output unit 106, receives the output current of the switching unit 103 sensed through the current sensing unit 105, and outputs a PWM signal with adjusted duty rate to the switching unit 103.

The initial driving unit 107 supplies a driving voltage for initial driving of the PWM controller 104 by rectifying an initial AC input voltage.

The description of an SMPS is disclosed in U.S. Pat. No. 6,510,066.

In general, in a power supply of a plasma display panel (PDP), due to a high voltage supplied as a sustain power and a high load current, a power source is supplied using two transformers, not one transformer as shown in FIG. 1. However, in a case where a voltage of one of the two transformers falls below a predetermined voltage, or a case where balance of the two transformers is not matched, the other one transformer must cover the capacity of the two transformers.

SUMMARY OF THE INVENTION

An exemplary embodiment of the present invention provides a power circuit protection apparatus for protecting a power circuit and peripheral circuits by halting an operation of a pulse width modulation (PWM) controller in a case of an abnormal state due to an open or short in a secondary side winding of a transformer regardless of the number of transformers included in the power circuit.

According to an exemplary embodiment of the present invention, there is provided a power circuit protection apparatus including: a transformer comprised of a primary side coil and secondary side coils, which receives a rectified DC voltage at its primary side coil and induces different voltage in its secondary side coils; an output unit which receives voltages output from the secondary side coils of the transformer, rectifies and smoothes the received voltage, and outputs the rectified and smoothed voltage; a PWM controller which receives the voltage output from the output unit and outputs a PWM signal with an adjusted duty cycle; a voltage sensing unit which senses the voltages induced in the secondary side coils of the transformer; a blocking unit which blocks interference between the voltage sensed in the voltage sensing unit and a first reference voltage; and a comparison unit which compares a variation value of the first reference voltage with respect to a second reference voltage and outputs a signal determining an on/off operation of the PWM controller.

In another exemplary embodiment of the present invention, the voltage sensing unit includes more than one rectifying diode for voltage detection, anode terminals of which are connected to the secondary side coils of the transformer, and which rectify the voltage received from the secondary side coils of the transformer, and the voltage sensing unit divides the rectified voltages output from the cathode terminals of the rectifying diodes using a resistor divider circuit and outputs the rectified and divided voltages as the sensing voltages.

In another exemplary embodiment of the present invention, the blocking unit includes diodes, anode terminals of which are connected to the first reference voltage terminal and cathode terminals of which are connected to corresponding output voltage terminals of the voltage sensing unit.

In another exemplary embodiment of the present invention, the number of diodes of the blocking unit is the same as the number of output voltages of the voltage sensing unit.

In another exemplary embodiment of the present invention, the comparison unit outputs a comparison result signal to halt the operation of the PWM controller when the first reference voltage is greater than the voltage sensed in the voltage sensing unit by a predetermined amount.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE ILLUSTRATIVE, NON-LIMITING EMBODIMENTS OF THE INVENTION

Hereinafter, illustrative, non-limiting embodiments of the present invention will now be described in detail with reference to the attached drawings.

Figure 1:
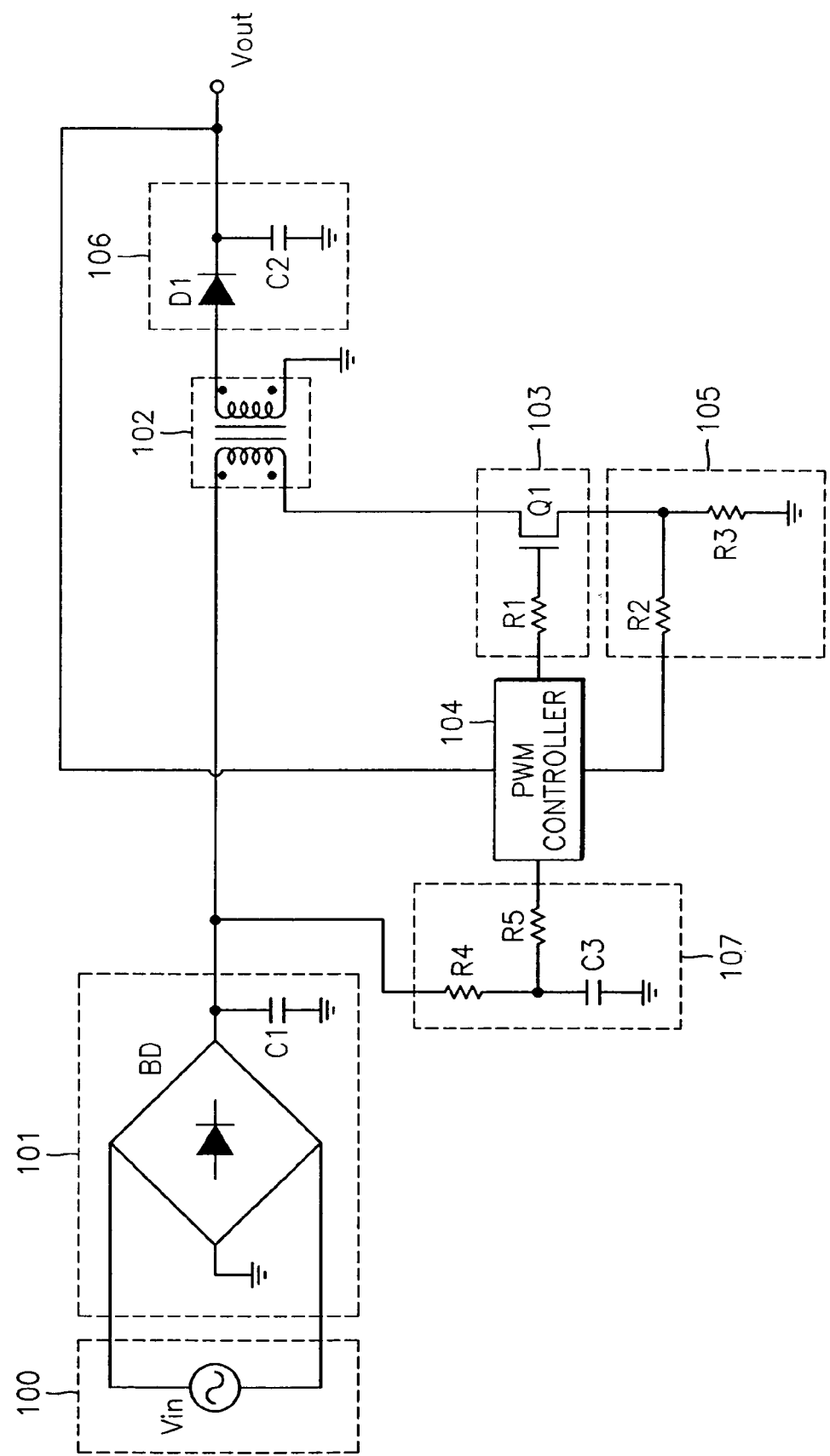
FIG. 1 is a block diagram of a conventional switching mode power supply (SMPS)
Figure 2:
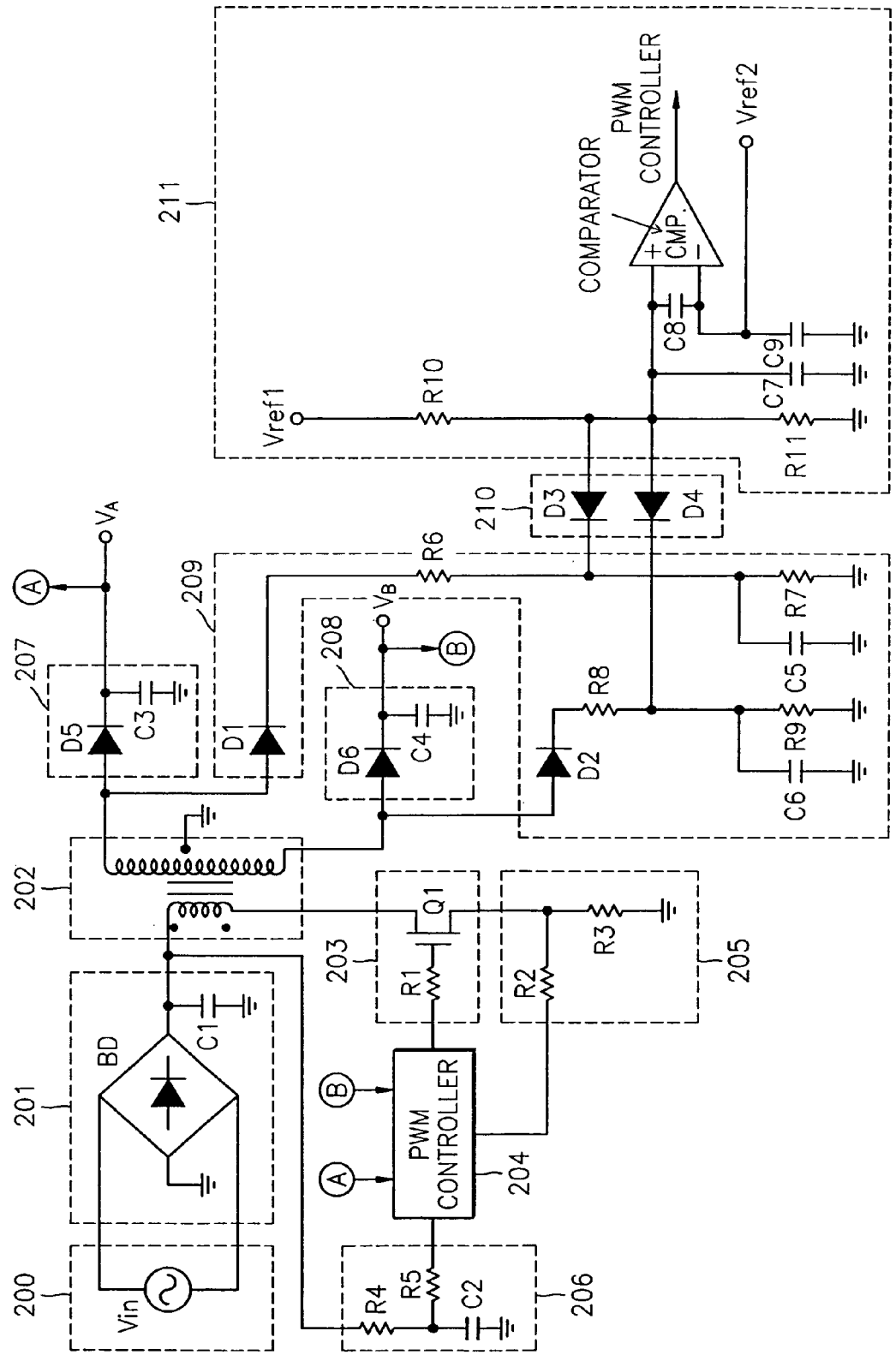
FIG. 2 is a block diagram of a power circuit protection apparatus according to an embodiment of the present invention.

FIG. 2 is a block diagram of a power circuit protection apparatus according to an embodiment of the present invention.

With reference to FIG. 2, the apparatus includes an AC input unit 200, a rectifier 201, a transformer 202, a switching unit 203, a PWM controller 204, a current sensing unit 205, an initial driving unit 206, output units 207 and 208, a voltage sensing unit 209, a blocking unit 210, and a comparison unit 211.

With reference to FIG. 2, an illustrative embodiment of the present invention will now be described in detail.

The AC input unit 200 inputs an AC voltage from the outside and conducts the AC voltage to the rectifier 201.

The rectifier 201 rectifies the AC voltage conducted from the AC input unit 200 into a DC voltage and outputs the DC voltage to a primary side coil of the transformer 202.

The transformer 202 inputs the DC voltage from the rectifier 201, is controlled by a switching control signal conducted from the switching unit 203, and induces a predetermined voltage in the secondary side coil of the transformer 202.

The output units 207 and 208 rectify and smooth the voltage induced in the secondary side coil of the transformer 202 and output predetermined voltages $V_A$ and $V_B$. The output units 207 and 208 include rectifying diodes D5 and D6 and smoothing condensers C3 and C4 for rectifying and smoothing the voltage induced in the secondary side coil of the transformer 202.

The switching unit 203 includes a switching component Q1 such as an FET, and the on/off time of the switching unit 203 is controlled by a PWM signal output from the PWM controller 204. Therefore, the switching unit 203 controls outputs of the transformer 202 in response to the PWM signal output from the PWM controller 204.

The current sensing unit 205 senses an output current of the switching unit 203 and conducts the sensed current to the PWM controller 204.

The PWM controller 204 receives the generated voltage error by sensing the voltages $V_A$ and $V_B$ output from the output units 207 and 208, receives the output current of the switching unit 203 sensed through the current sensing unit 205, and outputs a PWM signal with adjusted duty rate to the switching unit 203.

The initial driving unit 206 supplies a driving voltage for initial driving of the PWM controller 204 by rectifying an initial AC input voltage.

The voltage sensing unit 209 senses the voltage induced in the secondary side coil of the transformer 202. The voltage sensing unit 209 includes first and second rectifying diodes D1 and D2 for voltage detection, voltage dividing resistors R6–R9, and condensers C5 and C6. The anode terminals of the first and second rectifying diodes D1 and D2 for voltage detection are connected to opposite ends of the secondary side coil of the transformer 202. The rectified voltage output from the cathode terminal of the first rectifying diode D1 for voltage detection is divided by resistors R6 and R7, and the divided voltage is output as a first detection voltage. The rectified voltage output from the cathode terminal of the second rectifying diode D2 for voltage detection is divided by resistors R8 and R9, and the divided voltage is output as a second detection voltage.

The blocking unit 210 blocks interference between the first and second detection voltages output from the voltage sensing unit 209 and a first reference voltage $V_{ref1}$. The blocking unit 210 includes third and fourth blocking diodes D3 and D4, and the number of blocking diodes is the same as the number of rectifying diodes for voltage detection. The anode terminal of the third blocking diode D3 is connected to the terminal of the first reference voltage $V_{ref1}$, and the cathode terminal of the third blocking diode D3 is connected to the output terminal of the first rectifying diode D1 for voltage detection in the voltage sensing unit 209. The anode terminal of the fourth blocking diode D4 is connected to the terminal of the first reference voltage $V_{ref1}$, and the cathode terminal of the fourth blocking diode D4 is connected to the output terminal of the second rectifying diode D2 for voltage detection in the voltage sensing unit 209. The first reference voltage $V_{ref1}$ is set so that the anode voltages of the third and fourth blocking diodes D3 and D4 are greater than the cathode voltages thereof.

The comparison unit 211 compares a variation value of the first reference voltage $V_{ref1}$ and a second reference voltage $V_{ref2}$ and outputs a system control signal using the comparison result. In particular, in the present invention, the on/off operation of the PWM controller 204 is determined by the output signal of the comparison unit 211. The comparison unit 211 includes a comparator comparing the first reference voltage $V_{ref1}$ input through a resistor R11 and a capacitor C7 and the second reference voltage $V_{ref2}$.

When the first or second rectifying diode D1 or D2 for voltage detection connected to the secondary side coil of the transformer 202 becomes defective, that is, when at least one of two voltages induced in the secondary side coil of the transformer 202 drops, the voltage interlinked by the first or second rectifying diode D1 or D2 for voltage detection is not conducted, or a low voltage is induced in the first or second rectifying diode D1 or D2 for voltage detection. Then, the third or fourth blocking diode D3 or D4 is forward biased, and the first reference voltage $V_{ref1}$ is transferred through the third or fourth blocking diode D3 or D4. That is, the first reference voltage $V_{ref1}$ drops below a predetermined value. Then, the first reference voltage $V_{ref1}$ that has dropped below the predetermined value is input to the first input terminal of the comparator, and the second reference voltage $V_{ref2}$ is input to the second input terminal of the comparator. The comparator outputs the result of the comparison as a system control signal. In the present invention, when $V_{ref1}$ is less than $V_{ref2}$, the comparator outputs the system control signal to halt the operation of the PWM controller 204.

When an abnormal state is not generated in the first and second rectifying diodes D1 and D2 for voltage detection connected to the secondary side coil of the transformer 202, that is, when the voltages induced in the secondary side coil of the transformer 202 do not drop, the voltages detected in the first and second rectifying diodes D1 and D2 for voltage detection are greater than the first reference voltage $V_{ref1}$. Then, the third and fourth blocking diodes D3 and D4 are not forward biased, and the first reference voltage $V_{ref1}$ remains at its present value. Then, the first reference voltage $V_{ref1}$ is input to the first input terminal of the comparator, and the second reference voltage $V_{ref2}$ is input to the second input terminal of the comparator. The comparator outputs the result of the comparison as a system control signal. In the present invention, when $V_{ref1}$ is equal to or larger than $V_{ref2}$, the comparator outputs the system control signal to go on the operation of the PWM controller 204.

Figure 3:
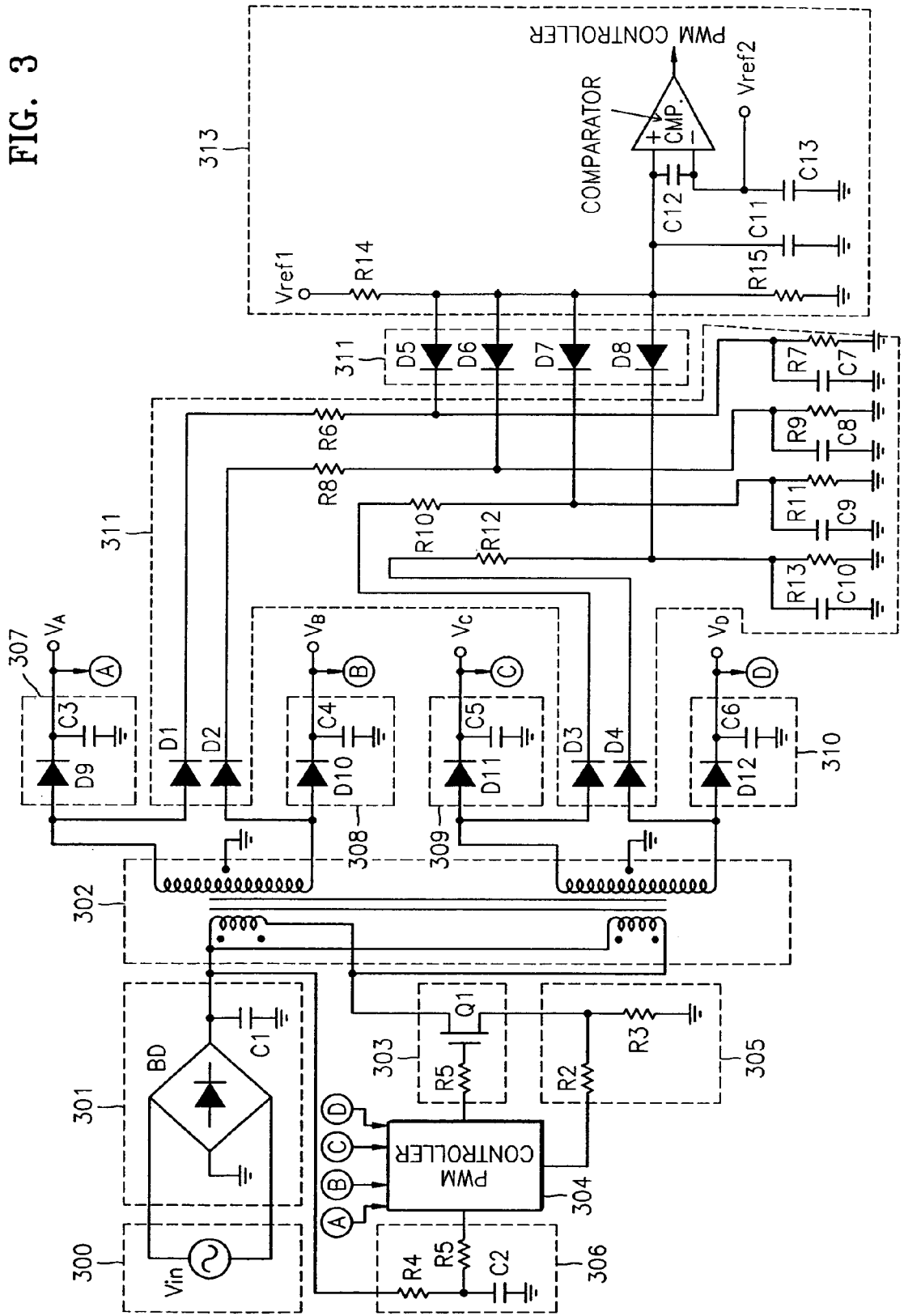
FIG. 3 is a block diagram of a power circuit protection apparatus according to another embodiment of the present invention.

FIG. 3 is a block diagram of a power circuit protection apparatus according to another embodiment of the present invention.

With reference to FIG. 3, the apparatus includes an AC input unit 300, a rectifier 301, a transformer 302, a switching unit 303, a PWM controller 304, a current sensing unit 305, an initial driving unit 306, output units 307–310, a voltage sensing unit 311, a blocking unit 312, and a comparison unit 313.

With reference to FIG. 3, another illustrative embodiment of the present invention will now be described in detail.

The AC input unit 300 inputs an AC voltage from the outside and conducts the AC voltage to the rectifier 301.

The rectifier 301 rectifies the AC voltage conducted from the AC input unit 300 into a DC voltage and outputs the DC voltage to a primary side coil of the transformer 302.

The transformer 302 inputs the DC voltage from the rectifier 301, is controlled by a switching control signal conducted from the switching unit 303, and induces more than one predetermined voltage in secondary side coils of the transformer 302. Unlike the transformer 202 of FIG. 2, the transformer 302 of FIG. 3 includes two transformers.

The output units 307–310 rectify and smooth the voltage induced in the secondary side coils of the transformer 302 and output predetermined voltages $V_A$ and $V_B$, and $V_C$ and $V_D$. The output units 307–310 include rectifying diodes D9–D12 and smoothing condensers C3–C6 for rectifying and smoothing the voltage induced in the secondary side coils of the transformer 302.

The switching unit 303 includes a switching component Q1 such as an FET, and the on/off time of the switching unit 303 is controlled by a PWM signal output from the PWM controller 304. Therefore, the switching unit 303 controls outputs of the transformer 302 in response to the PWM signal output from the PWM controller 304.

The current sensing unit 305 senses an output current of the switching unit 303 and conducts the sensed current to the PWM controller 304.

The PWM controller 304 receives the generated voltage error by sensing the voltages $V_A$ and $V_B$, and $V_C$ and $V_D$ output from the output units 307–310, receives the output current of the switching unit 303 sensed through the current sensing unit 305, and outputs a PWM signal with adjusted duty rate to the switching unit 303.

The initial driving unit 306 supplies a driving voltage for initial driving of the PWM controller 304 by rectifying an initial AC input voltage.

The voltage sensing unit 311 senses the voltages induced in the secondary side coils of the transformer 302. The voltage sensing unit 311 includes first through fourth rectifying diodes D1–D4 for voltage detection, voltage dividing resistors R6–R13, and condensers C7–C10. The anode terminals of the first through fourth rectifying diodes D1–D4 for voltage detection are connected to opposite ends of the secondary side coils of the transformer 302. The rectified voltage output from the cathode terminal of the first rectifying diode D1 for voltage detection is divided by resistors R6 and R7, and the divided voltage is output as a first detection voltage. The rectified voltage output from the cathode terminal of the second rectifying diode D2 for voltage detection is divided by resistors R8 and R9, and the divided voltage is output as a second detection voltage. The rectified voltage output from the cathode terminal of the third rectifying diode D3 for voltage detection is divided by resistors R10 and R11, and the divided voltage is output as a third detection voltage. The rectified voltage output from the cathode terminal of the fourth rectifying diode D4 for voltage detection is divided by resistors R12 and R13, and the divided voltage is output as a fourth detection voltage.

The blocking unit 312 blocks interference between the first through fourth detection voltages output from the voltage sensing unit 311 and a first reference voltage $V_{ref1}$. The blocking unit 312 includes fifth through eighth blocking diodes D5–D8, and the number of blocking diodes is the same as the number of rectifying diodes for voltage detection. The anode terminal of the fifth blocking diode D5 is connected to the terminal of the first reference voltage $V_{ref1}$, and the cathode terminal of the fifth blocking diode D5 is connected to the output terminal of the first rectifying diode D1 for voltage detection in the voltage sensing unit 311. The anode terminal of the sixth blocking diode D6 is connected to the terminal of the first reference voltage $V_{ref1}$, and the cathode terminal of the sixth blocking diode D6 is connected to the output terminal of the second rectifying diode D2 for voltage detection in the voltage sensing unit 311. The anode terminal of the seventh blocking diode D7 is connected to the terminal of the first reference voltage $V_{ref1}$, and the cathode terminal of the seventh blocking diode D7 is connected to the output terminal of the third rectifying diode D3 for voltage detection in the voltage sensing unit 311. The anode terminal of the eighth blocking diode D8 is connected to the terminal of the first reference voltage $V_{ref1}$, and the cathode terminal of the eighth blocking diode D8 is connected to the output terminal of the fourth rectifying diode D4 for voltage detection in the voltage sensing unit 311. The first reference voltage $V_{ref1}$ is set so that the anode voltages of the fifth through eighth blocking diodes D5–D8 are greater than the cathode voltages thereof.

The comparison unit 313 compares a variation value of the first reference voltage $V_{ref1}$ and a second reference voltage $V_{ref2}$ and outputs the comparison result as a system control signal. In particular, in the present invention, the on/off operation of the PWM controller 304 is determined by the output signal of the comparison unit 313. The comparison unit 313 includes a comparator comparing the first reference voltage $V_{ref1}$ input through a resistor R15 and a capacitor C11 and the second reference voltage $V_{ref2}$.

When at least one diode (for example, D1) among the first through fourth rectifying diodes D1–D4 for voltage detection connected to the secondary side coils of the transformer 302 becomes defective, that is, when at least one of four voltages induced in the secondary side coils of the transformer 302 drops, the voltage interlinked by the first rectifying diode D1 for voltage detection is not conducted or a low voltage is induced at the cathode of the first rectifying diode D1. Then, the fifth blocking diode D5 is forward biased, and the first reference voltage $V_{ref1}$ is transferred through the fifth blocking diode D5. That is, the first reference voltage $V_{ref1}$ drops below a predetermined value. Then, the first reference voltage $V_{ref1}$ which has dropped below the predetermined value is input to the first input terminal of the comparator, and the second reference voltage $V_{ref2}$ is input to the second input terminal of the comparator. The comparator outputs the comparison result as a system control signal. In the present invention, the comparator outputs the system control signal to halt the operation of the PWM controller 304.

When none of the first through fourth rectifying diodes D1–D4 for voltage detection connected to the secondary side coils of the transformer 302 are defective, that is, when the voltages induced in the secondary side coils of the transformer 302 do not drop, each of the voltages detected in the first through fourth rectifying diodes D1–D4 for voltage detection are greater than the first reference voltage $V_{ref1}$. Then, the fifth through eighth blocking diodes D5–D8 are not forward biased, and the first reference voltage $V_{ref1}$ remains the present value. Then, the first reference voltage $V_{ref1}$ is input to the first input terminal of the comparator, and the second reference voltage $V_{ref2}$ is input to the second input terminal of the comparator. The comparator outputs the comparison result as a system control signal. In the present invention, the comparator outputs the system control signal to go on the operation of the PWM controller 304.

As described above, a power circuit protection apparatus according to the present invention can protect a power circuit and peripheral circuits by halting an operation of a pulse width modulation (PWM) controller in a case of an abnormal state due to an open or short in a secondary side winding of a transformer regardless of the number of transformers included in the power circuit.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A power circuit protection apparatus comprising:
   a transformer comprised of a primary side coil and a plurality of said transformer receiving voltage at the primary side coil and inducing a different voltage in the secondary side coil;
   an output unit which receives a voltage output from the secondary side coils of the transformer, rectifies and smoothes the received voltage, and outputs the rectified and smoothed voltage;
   a pulse width modulation (PWM) controller which receives the voltage output from the output unit and outputs a PWM signal with an adjusted duty cycle;
   a voltage sensing unit which senses the voltage induced in the secondary side coils of the transformer;
   a blocking unit which blocks interference between the voltage sensed in the voltage sensing unit and a first reference voltage; and
   a comparison unit which compares a variation value of the first reference voltage with respect to a second reference voltage and outputs a signal determining an on/off operation of the PWM controller.

2. The apparatus of claim 1, wherein the voltage sensing unit includes more than one rectifying diode for voltage detection, anode terminals of said diodes being connected to the secondary side coils of the transformer, said diodes rectifying the voltage received from the secondary side coils of the transformer, and said voltage sensing unit dividing the rectified voltages output from cathode terminals of the rectifying diodes using a resistor divider circuit and outputting the rectified and divided voltages as the sensing voltages.

3. The apparatus of claim 1, wherein the blocking unit includes diodes having anode terminals connected to the first reference voltage terminal and cathode terminals connected to corresponding output voltage terminals of the voltage sensing unit.

4. The apparatus of claim 3, wherein the number of diodes of the blocking unit is the same as the number of output voltages of the voltage sensing unit.

5. The apparatus of claim 1, wherein the comparison unit outputs a comparison result signal to halt the operation of the PWM controller when the first reference voltage is greater than the voltage sensed in the voltage sensing unit by a predetermined amount.

* * * * *